(12) United States Patent
Nakamura

(10) Patent No.: US 6,891,645 B1
(45) Date of Patent: May 10, 2005

(54) IMAGE READING APPARATUS AND IMAGE READING METHOD

(75) Inventor: Yoichi Nakamura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 963 days.

(21) Appl. No.: 09/648,811

(22) Filed: Aug. 28, 2000

(30) Foreign Application Priority Data

Aug. 27, 1999 (JP) .......................................... 11-241549
Jun. 12, 2000 (JP) ...................................... 2000-174837

(51) Int. Cl.$^7$ ............................................. H04N 1/04
(52) U.S. Cl. ...................... 358/474; 358/505; 358/506; 358/514; 358/516; 358/475; 382/275; 382/255; 355/67; 355/71; 250/208.1; 348/96; 348/98
(58) Field of Search ............................... 358/474, 505, 358/506, 514, 516, 448, 475, 509; 355/67, 61; 382/275, 255

(56) References Cited

U.S. PATENT DOCUMENTS

| | | | | |
|---|---|---|---|---|
| 5,822,501 A | * | 10/1998 | Hattori | 358/1.7 |
| 5,991,010 A | * | 11/1999 | Nishio | 355/82 |
| 6,028,972 A | * | 2/2000 | Inatome et al. | 382/312 |
| 6,219,446 B1 | * | 4/2001 | Kiriki et al. | 382/167 |
| 6,486,974 B1 | * | 11/2002 | Nakai et al. | 358/1.9 |
| 6,552,778 B1 | * | 4/2003 | Konagaya | 355/71 |
| 6,603,885 B1 | * | 8/2003 | Enomoto | 382/263 |

* cited by examiner

Primary Examiner—Kimberly Williams
Assistant Examiner—Negussie Worku
(74) Attorney, Agent, or Firm—Sughrue Mion, PLLC

(57) ABSTRACT

An image reading apparatus in which extended image reading time is prevented when high quality image data is obtained, which image data is corrected by invisible light such as infrared light which is transmitted through an original. In a CCD scanner, visible light emitted from a light source is irradiated onto a photographic film. Infrared light emitted from the light source is reduced by an IR light reducing filter to be irradiated onto the photographic film. Visible light which has been transmitted through the photographic film is irradiated on a linear CCD by a lens unit, and the infrared light is reflected by a dichroic mirror to be irradiated on the linear CCD. Accordingly, the reading of invisible light can be effected at the same time that the reading of visible light is effected. It is therefore possible to prevent image reading time from becoming long due to the time required for the receiving of invisible light.

19 Claims, 12 Drawing Sheets

F I G. 3
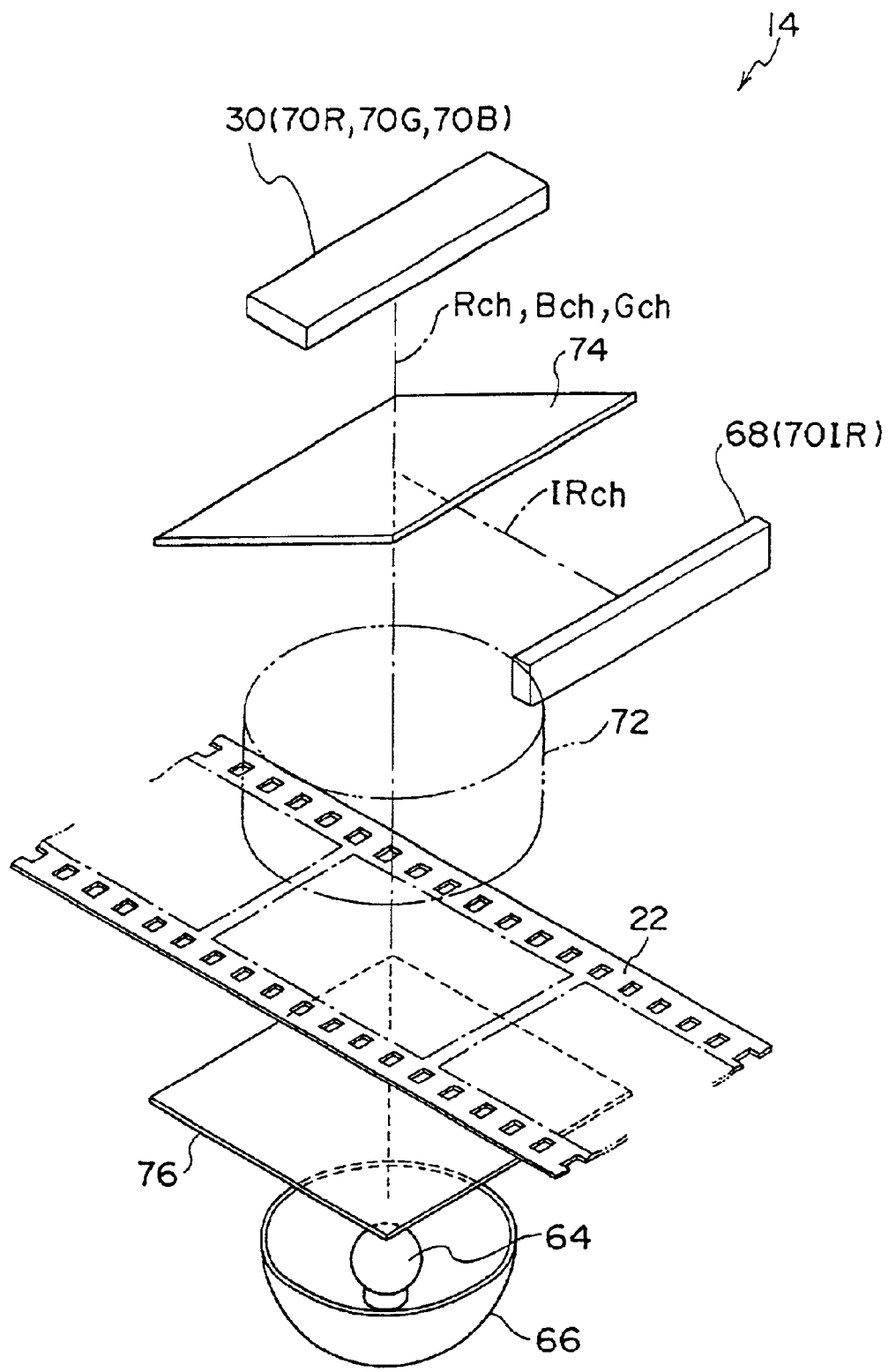

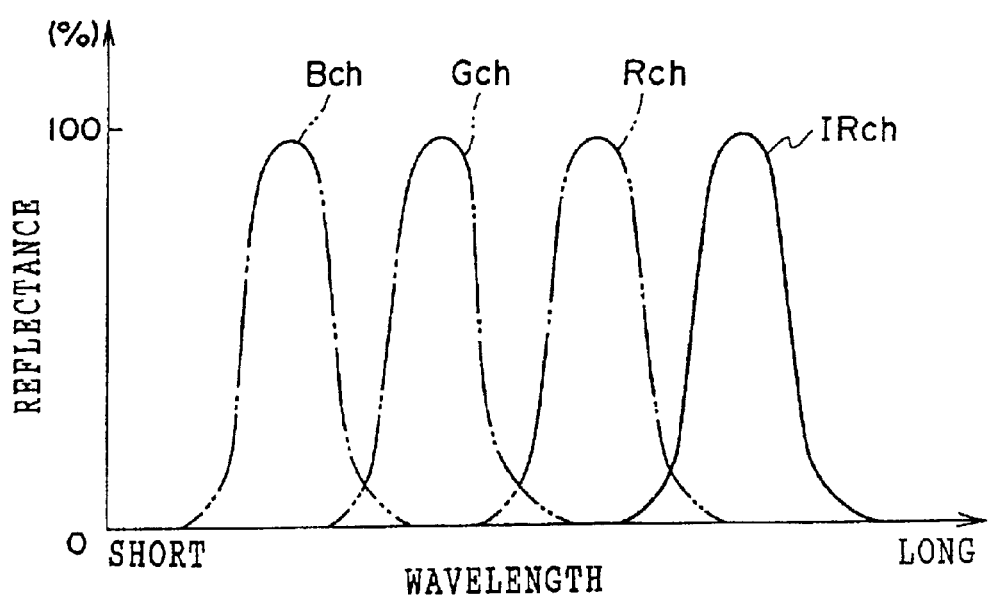
F I G. 4

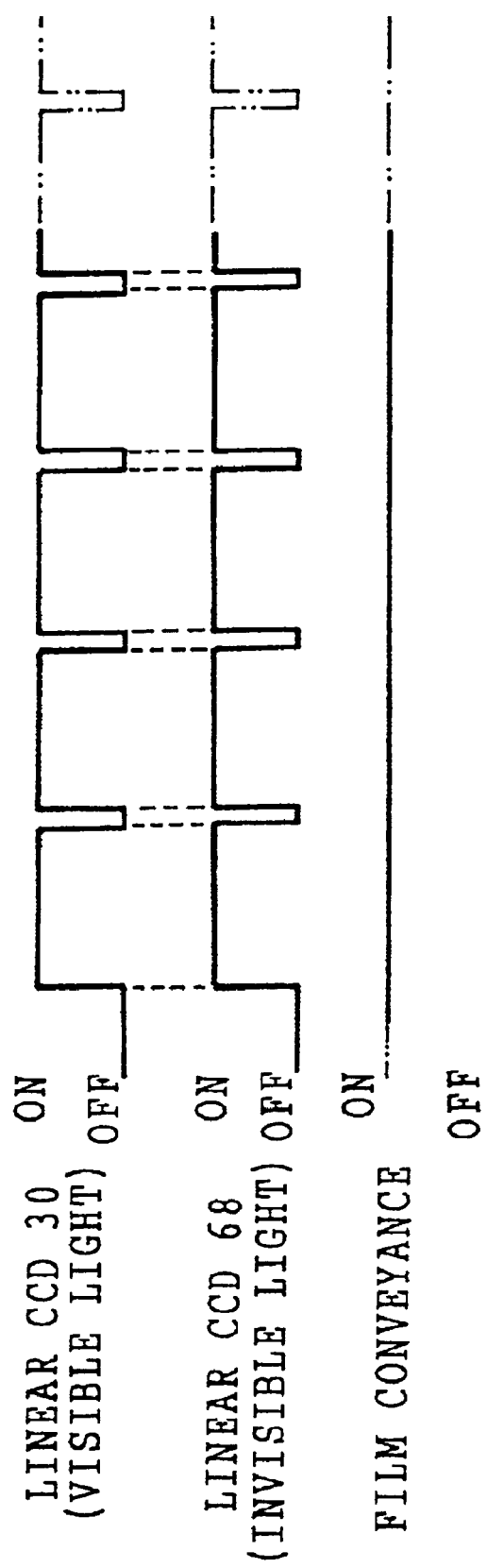

F I G. 7A
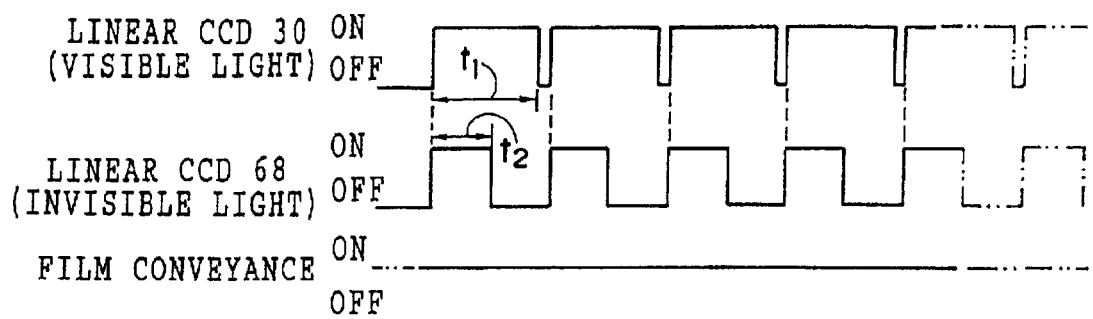
F I G. 7B
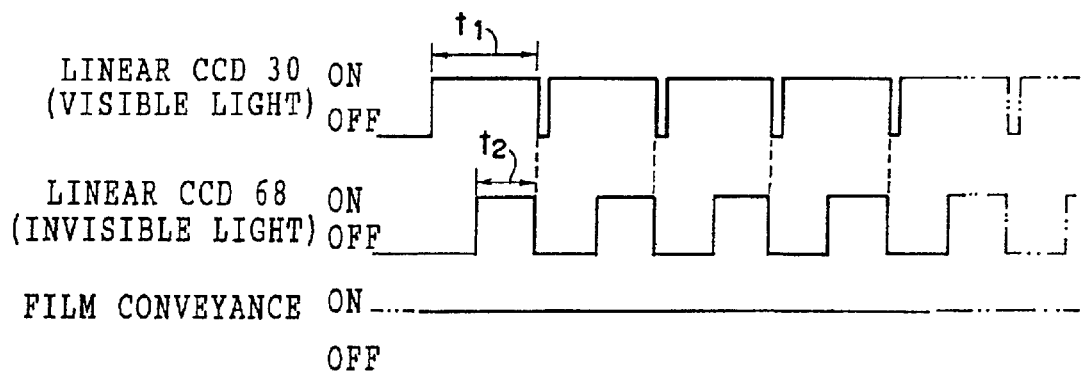
F I G. 7C
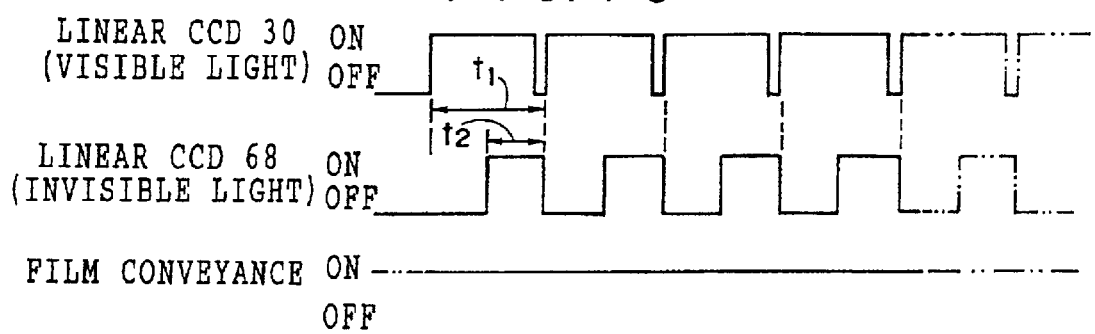
F I G. 7D
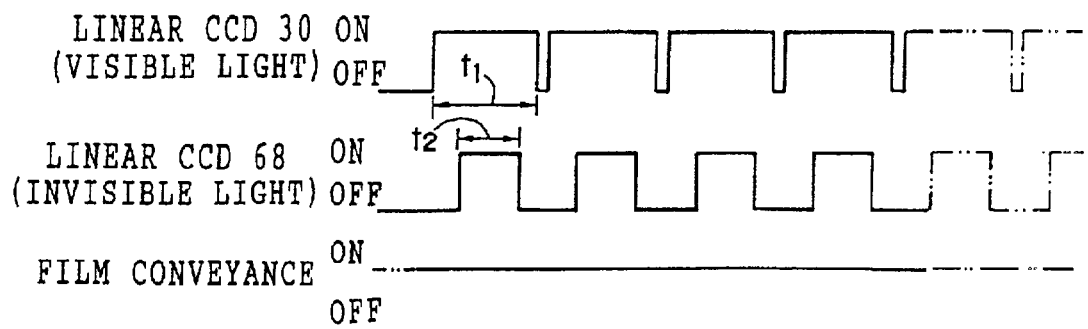

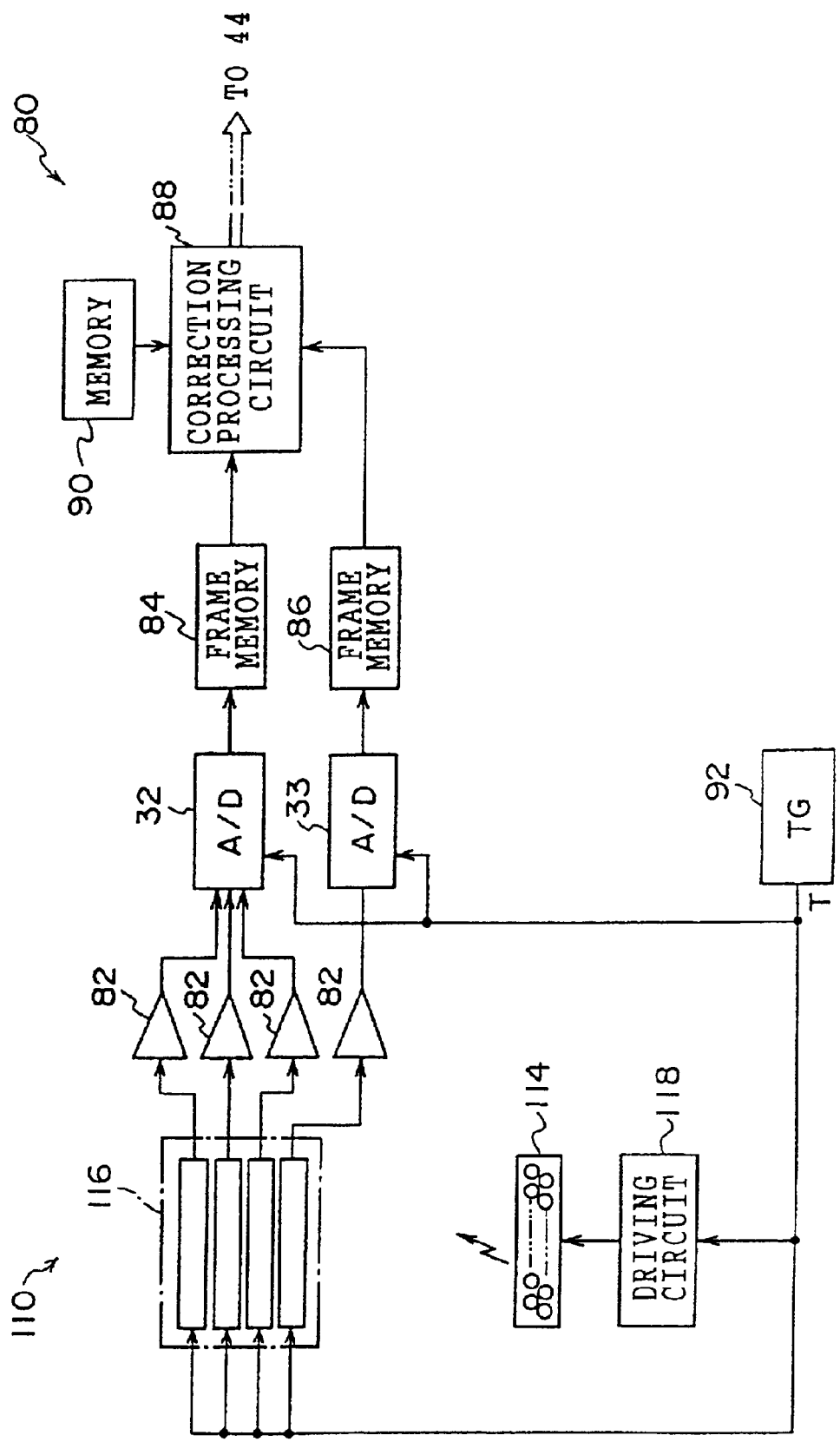

IMAGE READING APPARATUS AND IMAGE READING METHOD

BACKGROUND OF THE INVENTION

1. Field of the Invention

The present invention relates to an image reading apparatus which reads an image which is recorded on a transmission original which is such as a photographic film or the like by light which has been transmitted through the transmission original, and an image reading method thereof.

2. Description of the Related Art

In recent years, a technology has become more common in which an image which is recorded on an original such as a photographic film or the like is photoelectrically read by using a photoelectric conversion element such as a CCD or the like and is stored as digital image data, and then image processings such as enlargement and reduction of the image, various corrections, and the like is carried out on the digital image data, and an image is formed on a recording material such as a photographic printing paper or the like by a light beam which is modulated on the basis of the data subjected to image processing.

Generally, in an image reading apparatus, infrared light, which is emitted from a lamp which serves as a light source, is cut off by using an infrared light cutting filter so as to prevent a photographic film from being damaged by the infrared light emitted from the light source.

On the other hand, if the photographic film which is the transmission original is scratched or if dust adheres to the photographic film, when image reading is carried out by the CCD or the like, the scratches and dust significantly affect image data. Then, when an image is formed on the recording material on the basis of the image data, the scratches and dust appear and affect the finish of the image which is formed on the recording material.

In an image reading apparatus, in order to avoid the influence of such scratches or dust on the original, diffused light is irradiated onto the original when an image is read.

In recent years, the demand for high image quality of images formed by a light beam or the like has been growing, and image reading of high precision is becoming necessary in image reading apparatuses. Thus, in an image reading apparatus, pre-scanning, in which an image recorded on an original is read at low resolution, is carried out and image reading conditions are set. Then, fine-scanning, in which an image is read at high resolution on the basis of the image reading conditions set by the pre-scan, is carried out. As a result, image data having high precision can be obtained.

When image reading is carried out with high precision, it is difficult to form image data which is not affected by scratches on the photographic film or dust adhering to the photographic film simply by irradiating diffused light onto an original.

On the other hand, infrared light, which is invisible light, is transmitted without being affected by a visible image recorded on a transmission original such as a photographic film or the like, but if the photographic film is scratched or dust adheres to the photographic film, an amount of transmitted light varies.

In the invention disclosed in Japanese Patent Application Publication (JP-B) No. 6-78991 or the like, when a transmission original such as a photographic film is read, scratches, dust and the like on the transmission original are detected by infrared light and image data read by visible light is corrected so as to obtain appropriate image data which is not affected by scratches or dust on the photographic film.

However, when image reading is carried out with high precision, in addition to scanning for reading R, G and B image data, it is necessary to carry out scanning for reading data of invisible light such as infrared light. As a result, image reading takes a long time, and efficient and rapid image reading is interfered.

SUMMARY OF THE INVENTION

The present invention has been developed in view of the aforementioned facts and an object of the present invention is to provide an image reading apparatus and an image reading method in which, when image data having high precision is obtained by using invisible light such as infrared light or the like, rapid and precise image reading can be carried out.

A first aspect of the present invention is an image reading apparatus which reads a visible image which is formed on a transmission original from visible light which has been transmitted through the transmission original, and corrects the visible image by invisible light which has been transmitted through the transmission original. The image reading apparatus includes a light source which emits visible light and invisible light to the transmission original, a first photoelectric conversion device which receives visible light which is emitted from the light source and is transmitted through the transmission original, a second photoelectric conversion device which receives invisible light which is emitted from the light source and is transmitted through the transmission original, and a reading controlling device in which the reading of an invisible light image, in which invisible light is received by the second photoelectric conversion device, is carried out so as to be synchronized with the reading of a visible light image, in which visible light is received by the first photoelectric conversion device.

In accordance with the first aspect of the present invention, together with visible light, invisible light is irradiated from the light source onto the transmission original. Visible light is transmitted in accordance with an image formed on the transmission original and invisible light is transmitted in accordance with smudges and scratches on the transmission original.

Visible light which has been transmitted through the transmission original is received by the first photoelectric conversion device and is read as image data. Invisible light is read by the second photoelectric conversion device and is used for correcting the image data based on visible light.

The reading controlling device controls reading such that the receiving of invisible light by the second photoelectric conversion device is synchronized with the receiving of visible light by the first photoelectric conversion device. Accordingly, visible light and invisible light which have been transmitted through the transmission original can be received in parallel. Further, it is possible to read image data based on visible light and image data based on invisible light without separately carrying out scanning for reading visible light and scanning for reading invisible light.

In this manner, by being provided with a light source which emits invisible light together with visible light, and by being provided with the first and second photoelectric conversion devices, the receiving of invisible light by the second photoelectric conversion device can be synchronized with the receiving of visible light by the first photoelectric conversion device and effected. It is therefore possible to prevent image reading time from becoming long due to the time required for the receiving of invisible light. As a result, images with high quality can be rapidly and efficiently read.

When the visible light reading and the invisible light reading are effected by separate scannings, there is a drawback in that dust adhering to the transmission original may move, thereby generating discrepancies between the positions of the dust in the image read by visible light and the positions of the dust in the image read by invisible light. However, in the present invention, by synchronizing the invisible light reading with the visible light reading, discrepancies in the positions of dust adhering to the transmission original are not generated. Therefore, the visible light image can be appropriately corrected on the basis of the invisible light image.

In accordance with a second aspect of the present invention, the reading controlling device is designed such that invisible light is received by the second photoelectric conversion device to read an invisible light image at the same time visible light is received by the first photoelectric conversion device to read a visible light image.

In accordance with the second aspect of the present invention, the receiving of invisible light is effected at the same time that the receiving of visible light is effected.

For example, when the receiving of visible light and the receiving of invisible light are carried out in parallel, the receiving of visible light and the receiving of invisible light may be alternatively carried out. When the receiving of visible light and the receiving of invisible light are alternatively carried out, in order to obtain predetermined resolution, it is necessary to extend reading time by reducing a conveying speed. However, by receiving visible light and receiving invisible light at the same time, reading time can be further shortened as compared with a case in which the receiving of visible light and the receiving of invisible light are alternatively carried out.

The first photoelectric conversion device of the present invention may read color images or may read monochrome images. When the first photoelectric conversion device reads color images, for example, a CCD, which is separately provided as a light receiving element which receives R, G and B light, may be used, or a CCD, with which the light receiving element which receives respective color components of light is integrated, may be used.

As the second photoelectric conversion device, a light receiving element which receives infrared light as invisible light may be used or a light receiving element which receives ultraviolet light may be used.

Further, in the present invention, the first photoelectric conversion device may be integrated with the second photoelectric conversion device, or the first photoelectric conversion device and the second photoelectric conversion device may be separately disposed.

The present invention may include a deflecting device which selects and guides visible light which has been transmitted through the transmission original to the first photoelectric conversion device and which guides invisible light which has transmitted through the transmission original to the second photoelectric conversion device.

Accordingly, in the present invention, the receiving of visible light which has been transmitted through the transmission original and the receiving of invisible light which has been transmitted through the transmission original can be simultaneously carried out.

In accordance with a third aspect of the present invention, a light reducing device is included, which limits an intensity of invisible light emitted from a light source to a predetermined range.

In accordance with the third aspect of the present invention, invisible light emitted from the light source is reduced by the light reducing device. In conventional image reading apparatuses, when the reading of a visible light image or the like is carried out, invisible light such as infrared light is not necessary. Accordingly, in order to prevent a transmission original such as a photographic film or the like from being damaged, invisible light is substantially cut. In contrast, the light reducing device limits the intensity of invisible light so as not to affect the transmission original when invisible light is irradiated onto the transmission original.

Invisible light which is transmitted through the transmission original is received together with an image recorded on the transmission original by using a single light source, and an invisible light image can thereby be read.

In accordance with a fourth aspect of the present invention, the light source includes a first light source which emits visible light, a second light source which emits invisible light, and an optical device which guides visible light and invisible light which are emitted from the first and second light sources to the transmission original.

In accordance with the fourth aspect of the present invention, because the first light source which emits only visible light and the second light source which emits invisible light are separately provided, invisible light emitted from the second light source is deflected by the optical device and irradiated, together with visible light, onto the transmission original.

The receiving of invisible light by the second photoelectric conversion device can be carried out in parallel with the receiving of visible light by the first photoelectric conversion device.

A fifth aspect of the present invention includes a timing setting device which sets timings for the receiving of visible light and the reading of invisible light by the first and second photoelectric conversion devices. On the basis of timings set by the timing setting device, the first and second photoelectric conversion devices are operated.

In accordance with the fifth aspect of the present invention, the receiving of visible light and the reading of invisible light are carried out by operating the first and second photoelectric conversion devices by using a single timing setting device. Thus, information for the same position on an original can be read simultaneously. Image information read by visible light can be easily image-processed on the basis of information read by invisible light.

A reading controlling device may be such that, at least light-receiving by the first photoelectric conversion device and light-receiving by the second photoelectric conversion device begin simultaneously.

In accordance with a sixth aspect of the present invention, the second photoelectric conversion device is disposed in a position corresponding to the axial chromatic aberration of an optical system.

A lens or the like provided in the optical system has the axial chromatic aberration (the axial aberration) in which a focal position may deviate depending on wavelengths. The optical system is designed or corrected (is made achromatic) such that the axial chromatic aberration is eliminated at least within a range of visible light.

In the present invention, when invisible light is collected by such an optical system, the second photoelectric conversion device is provided so as to correspond to a focal position which is deviated by the axial chromatic aberration.

Thus, the axial chromatic aberration of invisible light is substantially eliminated.

Therefore, when an invisible light image is read, blurring of the image can be prevented by the axial chromatic aberration. Accordingly, small dust particles or slight scratches on the transmission original can be detected, and when an image is read with high precision, it is possible to precisely correct a visible light image on the basis of the invisible light image.

The optical system has the chromatic aberration of the focal distance in which the focal distance varies depending on wavelengths. The second photoelectric conversion device is preferably disposed so as to correspond to the focal distance due to the chromatic aberration of the focal distance.

In accordance with another aspect of the present invention, there is provided an image reading method which reads a visible image which is formed on a transmission original from visible light which has been transmitted through a transmission original and corrects the visible light by invisible light which has been transmitted through the transmission original. The image reading method includes a step of emitting visible light and invisible light to the transmission original, a step of carrying out the reading of a visible image, in which visible light, which is emitted from the light source and is transmitted through the transmission original, is received, and a step of carrying out the reading of an invisible image, in which invisible light is received so as to be synchronized with reading the visible image, in which visible light is received.

In this way, the reading of the invisible image, in which invisible light is received, is carried out so as to be synchronized with the reading of the visible image, in which visible light is received. It is therefore possible to prevent image reading time from becoming long due to the time required for the receiving of invisible light. As a result, images with high quality can be rapidly and efficiently read.

BRIEF DESCRIPTION OF THE DRAWINGS

FIG. 3 is a schematic perspective view showing an important portion of a CCD scanner used in a first embodiment.

FIG. 4 is a diagram illustrating a schematic structure of reflectance with respect to the wavelength of a dichroic mirror used in the first embodiment.

FIG. 6 is a timing chart of an example of timings for receiving visible light and invisible light, in accordance with the first embodiment.

FIG. 7A is a timing chart of another example of timings for receiving visible light and invisible light, which is applicable to the present invention.

FIG. 7B is a timing chart of another example of timings for receiving visible light and invisible light, which is applicable to the present invention.

FIG. 7C is a timing chart of another example of timings for receiving visible light and invisible light, which is applicable to the present invention.

FIG. 7D is a timing chart of another example of timings for receiving visible light and invisible light, which is applicable to the present invention.

FIG. 11 is a functional block diagram illustrating a schematic structure of the CCD scanner used in the second embodiment.

DESCRIPTION OF THE PREFERRED EMBODIMENTS

First Embodiment

Figure 1:
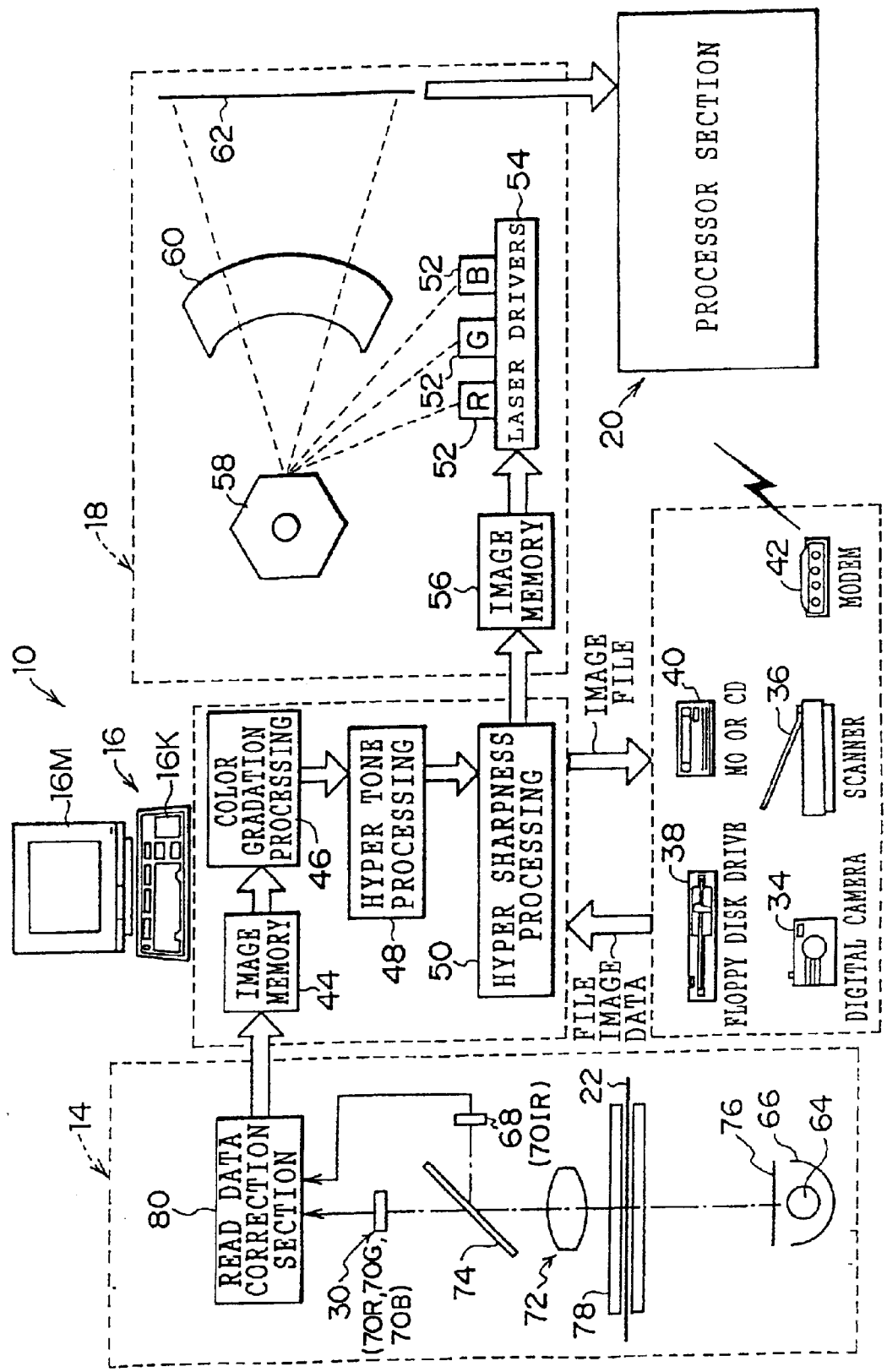
FIG. 1 is a schematic structural view illustrating a digital laboratory system used in the present embodiments and a CCD scanner provided in the digital laboratory system.
Figure 2:
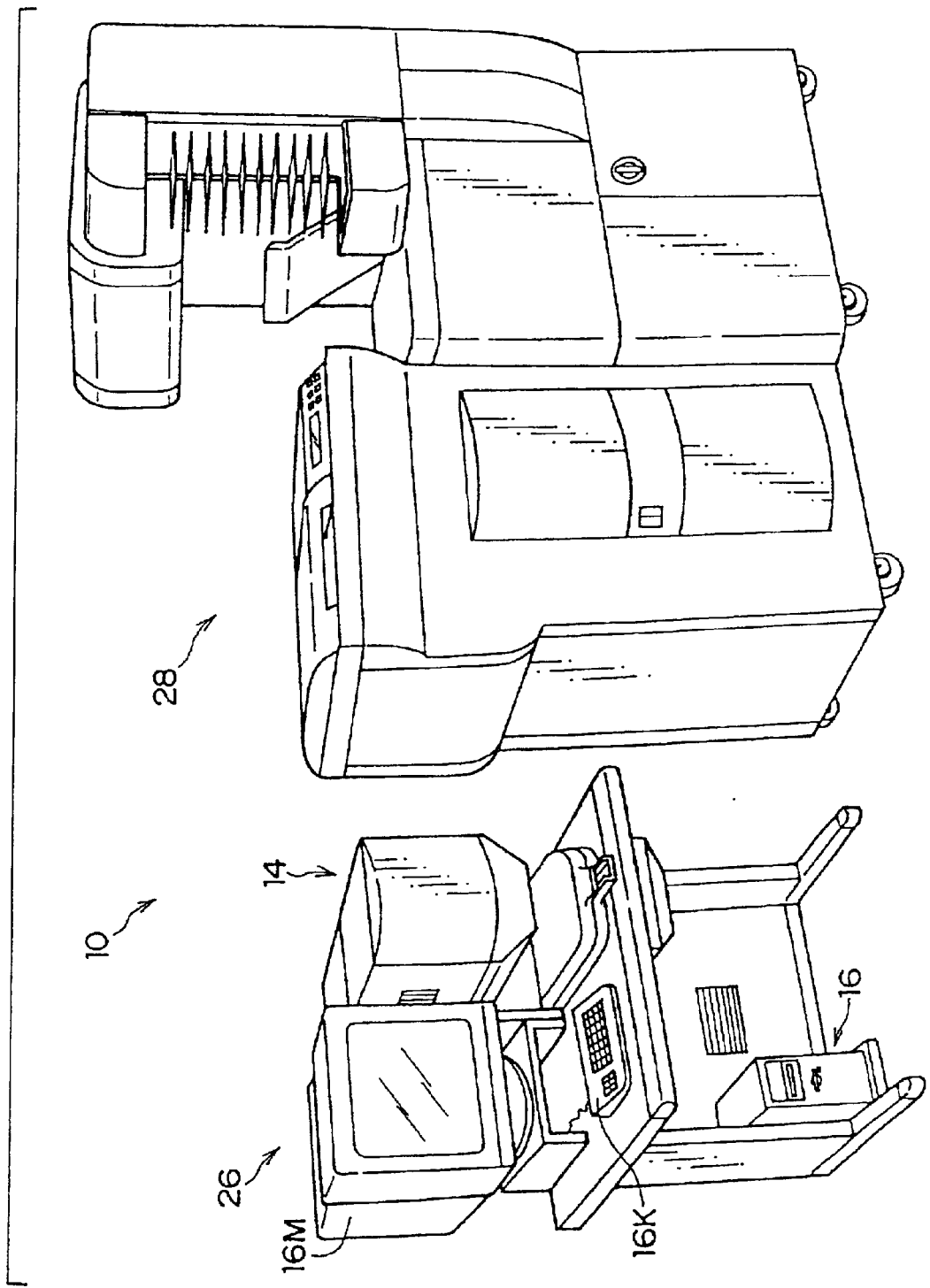
FIG. 2 is a schematic view of an exterior of the digital laboratory system used in the present embodiments.

Embodiments of the present invention will be described in detail hereinafter with reference to the drawings. FIGS. 1 and 2 show a schematic structure of a digital laboratory system 10 relating to the present embodiments.

The digital laboratory system 10 is structured to include an image processing section 16, a laser printer section 18, a processor section 20, and a CCD scanner 14 which serves as an image reading apparatus. As illustrated in FIG. 2, the CCD scanner 14 and the image processing section 16 are integrated to form an input device 26, and as illustrated in FIG. 1, the laser printer section 18 and the processor section 20 are integrated to form an output device 28.

The CCD scanner 14 reads a frame image recorded on a photographic film which is a transmission original such as a negative film, a reversal film, or the like. For example, the CCD scanner 14 may read the frame image of a 135 size photographic film, a 110 size photographic film, a photographic film on which a transparent magnetic layer is formed (a 240 size photographic film which is known as an APS film), and 120 size and 220 size (brownie size) photographic films.

The CCD scanner 14 reads the frame image of the above-described photographic film for reading by a linear CCD 30 and the frame image is A/D converted by an A/D converter 32 (see FIG. 5), and then is outputted to the image processing section 16 as image data (scanned image data) of one read image (one frame). Hereinafter, a description will be given of an example in which a 135 size photographic film 22 (see FIG. 1) is used in the digital laboratory system 10 (see FIGS. 1 and 3).

Scanned image data outputted from the CCD scanner 14 is inputted to the image processing section 16. As shown in FIG. 1, image data obtained by photographing using a digital camera 34 or the like can be inputted to the image processing section 16. Further, image data obtained by reading, in addition to the transmission original, a reflection original by a scanner 36 (flat-bed type), image data generated by a computer or the like, recorded on a recording medium, and inputted via a floppy disc drive 38, an MO drive or a CD drive 40 or the like, and image data (image file data) inputted by communication via a modem 42 or the like can be read in the image processing section 16.

The image processing section 16 stores inputted image data in an image memory 44, carries out image processings such as various types of correction in a color gradation processing section 46, a hyper processing section 48, a hyper sharpness processing section 50 and the like, and outputs the processed data to the laser printer section 18 as image data for recording. Further, the image processing section 16 can record the image data subjected to image processing, as image file data, in a storage medium (for example, floppy drive, MO, CD or the like) and output the image data to the outside, or the image processing section 16 can also output the image data to the outside via a communication line.

The input device 26 includes a keyboard 16K and a monitor 16M. A user can fetch images or carry out various image processings by operating keys of the keyboard 16K while looking at a display of the monitor 16K.

The laser printer section 18 temporarily stores the image data for recording inputted from the image processing section 16 in an image memory 56. The laser printer section 18 has R, G and B laser light sources 52, and an optical system including a polygon mirror 58, an fθ lens 60 and the like. Further, the laser printer section 18 controls a laser driver 54 such that laser light, which is modulated in accordance with the image data for recording stored in the image memory 56, is irradiated onto a photographic printing paper 62 to scan and expose the photographic printing paper 62. As a result, an image in accordance with the image data for recording stored in the image memory 56 is recorded on the photographic printing paper 62.

The processor section 20 carries out various processings (development processings) such as color forming development, bleach-fixing, washing, and drying on the photographic printing paper 62 on which an image has been recorded by scan-exposure in the laser printer section 18. As a result, an image is formed on the photographic printing paper 62.

As illustrated in FIG. 1, the CCD scanner 14 includes a film carrier 78. The photographic film 22 which is to be subjected to image reading is loaded into this film carrier 78. The photographic film 22 is conveyed at a constant speed by the film carrier 78.

As illustrated in FIG. 3, the CCD scanner 14 is provided with a linear CCD 30. The linear CCD 30 is provided with CCD arrays 70R, 70G, and 70B (see FIG. 5) in which light receiving elements, which detect R, G and B colors, are adjacently disposed in a straight line in a direction perpendicular to a conveying direction of the photographic film 22. The CCD scanner 14 uses the CCD arrays 70R, 70G, and 70B to carry out image reading (scanning) on a line-by-line basis in the direction perpendicular to the conveying direction of the photographic film 22 which is conveyed at a constant speed.

As illustrated in FIGS. 1 and 3, the CCD scanner 14 includes a light source 64 such as a metal halide lamp or a halogen lamp. A reflector 66 is disposed such that the light source 64 is positioned at a focal position. The light source 64 emits infrared light which is invisible light as well as visible light including respective color components of R, G, and B. Thus, visible light and invisible light emitted from the light source 64 are irradiated onto the photographic film 22 which is loaded into the film carrier 78. In FIG. 3, the film carrier 78 is not illustrated.

A lens unit 72 and the linear CCD 30 are disposed at the side of a conveying path of the photographic film 22 opposite the side at which the light source 64 is disposed. Light, which has been transmitted through the photographic film 22, is imaged on the linear CCD 30 by the lens unit 72. In the CCD scanner 14, light, which has been transmitted through the photographic film 22, is accumulated on light receiving elements of respective CCD arrays 70R, 70G, and 70B of the linear CCD 30 and an electric signal, which corresponds to an fa amount of light accumulated by the respective light receiving elements, is outputted at a predetermined timing. This electric signal is A/D converted within the CCD scanner 14 and outputted as image data of respective color components.

Accordingly, R, G and B color separation images which are recorded on the photographic film 22 are read. The linear CCD may have a conventionally known structure, and detailed description thereof is omitted in the present embodiments.

A dichroic mirror 74 is disposed between the lens unit 72 and the linear CCD 30. As illustrated in FIG. 4, this dichroic mirror 74 is designed such that reflectances of respective color components of R, G and B (Rch, Gch, and Bch) of light, which is visible light, are low, but reflectance of infrared light (IRch) used as invisible light is high. Namely, transmittance of the dichroic mirror 74 is high with respect to R, G, and B, but is low with respect to infrared light.

In this way, visible light, which has been transmitted through the lens unit 72 is transmitted through the dichroic mirror 74 and is imaged on the linear CCD 30, while infrared light, which has been transmitted through the photographic film 22 and the lens unit 72, is reflected by the dichroic mirror 74. The dichroic mirror 74 is, for example, tilted about 45° with respect to an optical axis of the lens unit 72 such that infrared light is reflected in a direction perpendicular to the optical axis. Here, in FIG. 4, areas of Rch, Gch, and Bch are shown by a double-dashed chain line. The reflectance of the dichroic mirror 74 is low in these areas.

As shown in FIGS. 1 and 3, a linear CCD 68 for detecting infrared light is disposed in a direction in which the dichroic mirror 74 reflects the infrared light. The linear CCD 68 includes, as the linear CCD 30 does, a CCD array 70IR (see FIG. 5) in which light receiving elements are arranged in a straight line in a direction perpendicular to the conveying direction of the photographic film 22. Infrared light which is reflected by the dichroic mirror 74 is imaged on the linear CCD 68.

As illustrated in FIG. 3, the lens unit 72 which forms an optical system is designed such that R, G and B lights (Rch, Gch, Bch), which have been transmitted through the photographic film 22, are imaged on the linear CCD 30. At this time, the axial chromatic aberration of the lens unit 72 is corrected, that is to say, the lens unit 72 is corrected (is made achromatic) such that R, G and B lights which have been transmitted through the same position on the photographic film 22 are imaged on CCD arrays 70R, 70G and 70B of the linear CCD 30, respectively.

On the other hand, the axial chromatic aberration of the lens unit 72 with respect to infrared light (IRch) remains uncorrected, and the focal position of infrared light deviates from the focal positions of R, G and B colors.

In the CCD scanner 14, the linear CCD 68 which receives infrared light is disposed in a position corresponding to the focal distance of the infrared light of the lens unit 72. Accordingly, the axial chromatic aberration of the lens unit 72 with respect to infrared light is substantially eliminated.

In the CCD scanner 14, an IR light reducing filter 76 which slightly transmits infrared light is disposed between the light source 64 and the conveying path of the photo graphic film 22. In order to prevent the photographic film 22 from being damaged by infrared light, an image reading apparatus or the like is generally provided with an IR cutting filter to cut substantially 100% of infrared light unnecessary for image reading. In contrast, in the CCD scanner 14, the IR light reducing filter 76 is disposed such that a portion of infrared light emitted from the light source 64 is transmitted toward the photographic film 22.

The transmittance of the IR light reducing filter 76 with respect to infrared light is about 10% to 50%. The IR light reducing filter 76 is designed such that the intensity of infrared light which is transmitted through the IR light reducing filter 76 and is irradiated onto the photographic film 22 is set in a range in which the photographic film 22 is not damaged. Further, in the IR light reducing filter 76, when light receiving elements of the linear CCD 68 receive infrared light which has been transmitted through the photographic film 22 at the same timing of the linear CCD 30, infrared light is reduced such that the light receiving elements are not saturated, for example, the amount of light received by the light receiving elements is about 50% of the saturation amount thereof.

Figure 5:
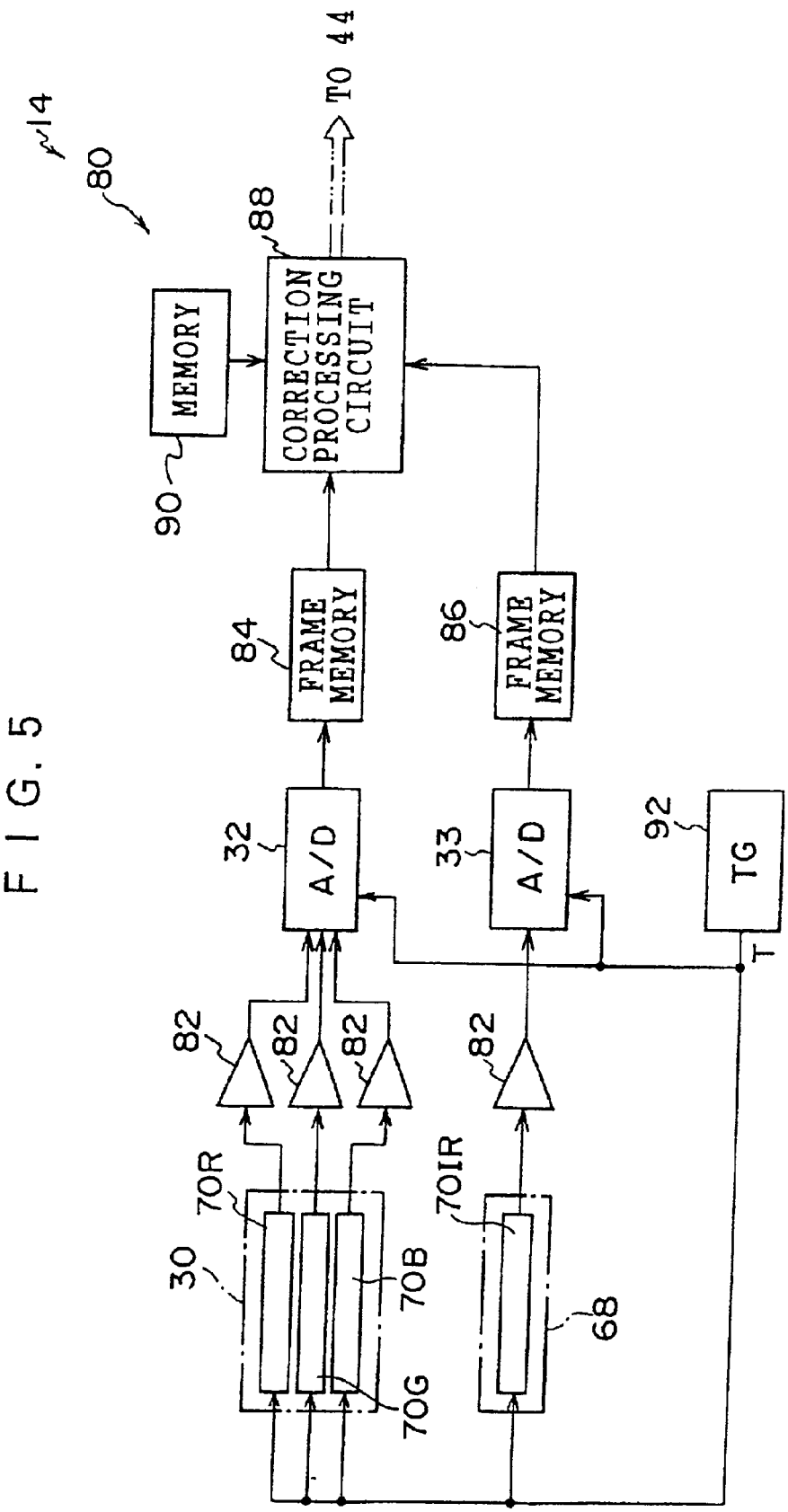
FIG. 5 is a functional block diagram illustrating a schematic structure of the CCD scanner used in the first embodiment.

As shown in FIG. 1, the CCD scanner 14 includes a read data correction section 80. As shown in FIG. 5, the read data correction section 80 includes amplifiers 82 and an A/C converter 32. R, G and B electric signals which are outputted from the linear CCD 30 are inputted to the A/D converter 32 via amplifiers 82. Further, the read data correction section 80 includes an amplifier 82 and an A/D converter 33 so as to correspond to the linear CCD 68. Output of the linear CCD 68 which receives infrared light is inputted to the A/D converter 33 via the corresponding amplifier 82.

Outputs of the A/D converter 32 and the A/D converter 33 are inputted to a frame memory 84 and a frame memory 86, respectively. R, G and B image data based on visible light which has been transmitted through the photographic film 22 are successively inputted to the frame memory 84 such that image data of one frame of the photographic film 22 is stored in the frame memory 84. Image data based on infrared light which has been transmitted through the photographic film 22 is successively inputted to the frame memory 86 such that infrared light image data of one frame is stored in the frame memory 86.

The read data correction section 80 is provided with a correction processing circuit 88. The frame memories 84 and 86 are connected to the correction processing circuit 88. In the correction processing circuit 88, R, G and B image data which is stored in the frame memory 84 is corrected on the basis of infrared light image data which is stored in the frame memory 86 and the corrected data is outputted. Accordingly, image data is generated in which scratches on the image frame portion of the photographic film 22 and dust adhering to the image frame portion are removed.

Output of the correction processing circuit 88 is inputted, as image data of one frame of the photographic film 22, to the image memory 44 of the image processing section 16.

The CCD scanner 14 includes a memory 90 which stores, in advance, shading correction data with respect to visible light (R, G, and B) and with respect to invisible light (infrared light: IR). In the correction processing circuit 88, on the basis of this shading correction data, shading correction of image data is also carried out.

When image processing is carried out in the correction processing circuit 88 or the like, if there is a so-called magnification chromatic aberration in which magnification is deviated in a focusing position by a color, or if there is an assembling error of the linear CCD 60, 68 or the like, it is preferable to carry out the image processing so as to eliminate the magnification chromatic aberration and the assembling error.

The CCD scanner 14 is provided with a synchronized signal generating circuit (TG) 92. A synchronized signal T is outputted from the synchronized signal generating circuit 92 to the linear CCDs 30 and 68, and the A/D converters 32 and 33. The linear CCDs 30 and 68 operate in accordance with the synchronized signal T to output electric signals. The A/D converters 32 and 33 carry out A/D conversion on the electric signals input from the linear CCDs 30 and 68 at a timing on the basis of the synchronized signal T and the converted signals are output.

The reading of image data by the CCD scanner 14 will be described hereinafter as an operation of the first embodiment.

In the digital laboratory system 10, when an image, which is recorded on the photographic film 22, is to be read by the CCD scanner 14, the photographic film 22 is first inserted and loaded into the film carrier 78. Then, the start of image reading is designated by operating keys of the keyboard 16K in the image processing section 16. In the CCD scanner 14, the photographic film 22 is conveyed at a constant speed and pre-scanning is carried out on respective frame images. In this pre-scanning, light, which has been transmitted through the photographic film 22, is read by the linear CCD 30 on a frame-by-frame frame basis. In this way, R, G and B pre-scanned image data for each frame are read.

In the CCD scanner 14, on the basis of image data read by pre-scanning, reading conditions at the time at which fine-scanning is carried out are set on a frame-by-frame basis. The image data which is read by pre-scanning is displayed on, for example, the monitor 16M.

When the pre-scanning of all frames of the photographic film 22 loaded into the film carrier 78 is finished, fine-scanning is started. In fine-scanning, the photographic film 22 is conveyed, for example, in a direction opposite to the direction in which the pre-scan was carried out. Light which has been transmitted through respective frames of the photographic film 22 is read by the linear CCDs 30 and 68.

In the CCD scanner 14, when a frame of the photographic film 22 reaches a predetermined position, the linear CCDs 30 and 68 are operated on the basis of the synchronized signal T outputted from the synchronized signal generating circuit 92 to successively read R, G and B color separation images and an infrared light image on a line-by-line basis. Outputs of the linear CCDs 30 and 68 are successively A/D converted by the A/D converters 32 and 33 so as to be stored in the frame memories 84 and 86.

When the CCD scanner 14 stores image data of one frame of the photographic film 22 in the frame memories 84 and 86, correction processing is carried out on the image data in the correction processing circuit 88. At this time, in the correction processing circuit 88, shading correction is carried out on the image data read by the linear CCDs 30 and 68 on the basis of correction values stored in the memory 90. At the same time, in the correction processing circuit 88, R, G and B image data stored in the frame memory 84 are corrected on the basis of infrared light image data stored in the frame memory 86.

That is to say, in a state in which scratches are not generated on the photographic film 22 and dust is not adherent thereto, an amount of infrared light which is transmitted through the photographic film 22 is constant. Thus, infrared light image data stored in the frame memory 86 also becomes constant data. In contrast, if scratches are generated on the photographic film 22 or dust is adherent thereto, a transmitted amount of infrared light varies and corresponding pixel data also varies.

In the correction processing circuit 88, R, G and B pixel data at positions corresponding to pixels in which infrared light image data vary are interpolated by surrounding pixel data. Thus, read image data can be prevented from being changed by scratches on the photographic film 22 or dust adhering to the photographic film 22.

R, G and B image data corrected in the read data correction section 80 are outputted from the CCD scanner 14 to the image processing section 16 to be stored in the image memory 44 in the image processing section 16.

The CCD scanner 14 is designed to emit infrared light which is invisible light, as well as visible light, from the light source 64. In general, an IR cutting filter is used to cut substantially 100% of infrared light emitted from the light source 64. In contrast, in the CCD scanner 14, the IR light reducing filter 76 is used such that a portion of infrared light emitted from the light source 64 is irradiated onto the photographic film 22.

Further, in the CCD scanner 14, the dichroic mirror 74 and the linear CCD 68 are disposed between the lens unit 72 and the linear CCD 30. Thus, infrared light which has been transmitted through the photographic film 22 is reflected by the dichroic mirror 74 toward the linear CCD 68.

In this way, in the CCD scanner 14, infrared light which has been transmitted through the photographic film 22 can be detected together with respective color components of R, G, and B of light which have also been transmitted through the photographic film 22.

In the CCD scanner 14, the linear CCD 68 which receives infrared light is provided at a position in which the axial chromatic aberration of the lens unit 72 with respect to infrared light is eliminated. Accordingly, small dust particles and slight scratches on the photographic film 22 can be reliably read. Namely, the precision for detecting dust or scratches on the photographic film 22 is enhanced by the linear CCD 68.

Accordingly, R, G and B image data read with high precision can be accurately corrected by infrared light image data.

In the CCD scanner 14, when an image which is recorded on the photographic film 22 is read by the linear CCD 30, reading is carried out on the basis of the synchronized signal T outputted from the synchronized signal generating circuit 92. The synchronized signal T is also outputted to the linear CCD 68 which detects infrared light.

As illustrated in FIG. 6, in the CCD scanner 14, when an image frame recorded on the photographic film 22 reaches a predetermined position, while the photographic film 22 is conveyed at a constant speed, the receiving of visible light by the linear CCD 30 and the receiving of invisible light by the linear CCD 68 begin simultaneously. At this time, the linear CCDs 30 and 68 receive visible light and invisible light respectively at predetermined intervals, and output electric signals corresponding to amounts of light received as image data of one line. In FIG. 6, when the linear CCDs 30 and 68 are turned on, light (light energy) is accumulated, and when the linear CCDs 30 and 68 are turned off, electric signals in accordance with the accumulated light energy (amount of light received) are outputted.

In this way, in the CCD scanner 14, infrared light image data is read at the same time R, G and B image data is read. That is to say, in the CCD scanner 14, the infrared light image is read so as to be synchronized with reading the R, G and B images.

Scratches generated on the photographic film 22 and dust adhering thereto are detected, and image data is corrected on the basis of the detected results. Therefore, additional time for reading infrared light in order to obtain high quality image data is not necessary, and the reading of an infrared light image can be carried out while the reading of R, G and B images is carried out.

In the CCD scanner 14, it is possible to read, without extending scanning time, appropriate image data in which the scratches on the photographic film 22 and the dust adhered thereto have been removed.

Further, in the CCD scanner 14, because the linear CCD 30, in which the reading of R, G, and B images is carried out, is synchronized with the linear CCD 68 in which the reading of an infrared light image is carried out, positioning of data and a timing for fetching the data can be simplified.

In FIG. 6, when the receiving of visible light for one line by the linear CCD 30 is tuned with the receiving of invisible light by the linear CCD 68, the receiving of light by the linear CCD 30 is synchronized with the receiving of light by the linear CCD 68 such that the receiving of light by the linear CCD 30 and the receiving of light by the linear CCD 68 simultaneously start and finish, but the present invention is not limited to this case.

When the time for the receiving of visible light by the linear CCD 30 is different from the time for the receiving of invisible light by the linear CCD 68, the receiving of invisible light may be carried out so as to be synchronized with the receiving of visible light.

For example, if time $t_2$ for the receiving of light by the linear CCD 68 is shorter than time $t_1$ for the receiving of light by the linear CCD 30 (i.e., $t_1>t_2$), as illustrated in FIG. 7A, the start of the receiving of light by the linear CCD 30 may be adjusted to the start of the receiving of light by the linear CCD 68. As illustrated in FIG. 7B, a timing for turning off the linear CCD 30 (a timing that the receiving of light for one line is finished) may be adjusted to a timing for turning off the linear CCD 68. Further, as illustrated in FIG. 7C, the linear CCD 30 may be synchronized with the linear CCD 68 such that the linear CCD 68 turns off when the linear CCD 30 starts the receiving of light for the next one line. As illustrated in FIG. 7D, the linear CCD 68 may be turned on or off while the linear CCD 30 turns on.

In the above-described first embodiment, a description has been given of a structure in which R, G and B image data and infrared light image data are read by the linear CCD 30 in which R, G and B light receiving elements are integrally arranged, and by the linear CCD 68 in which light receiving elements for infrared light are used, but the present invention is not limited to this structure.

Figure 8:
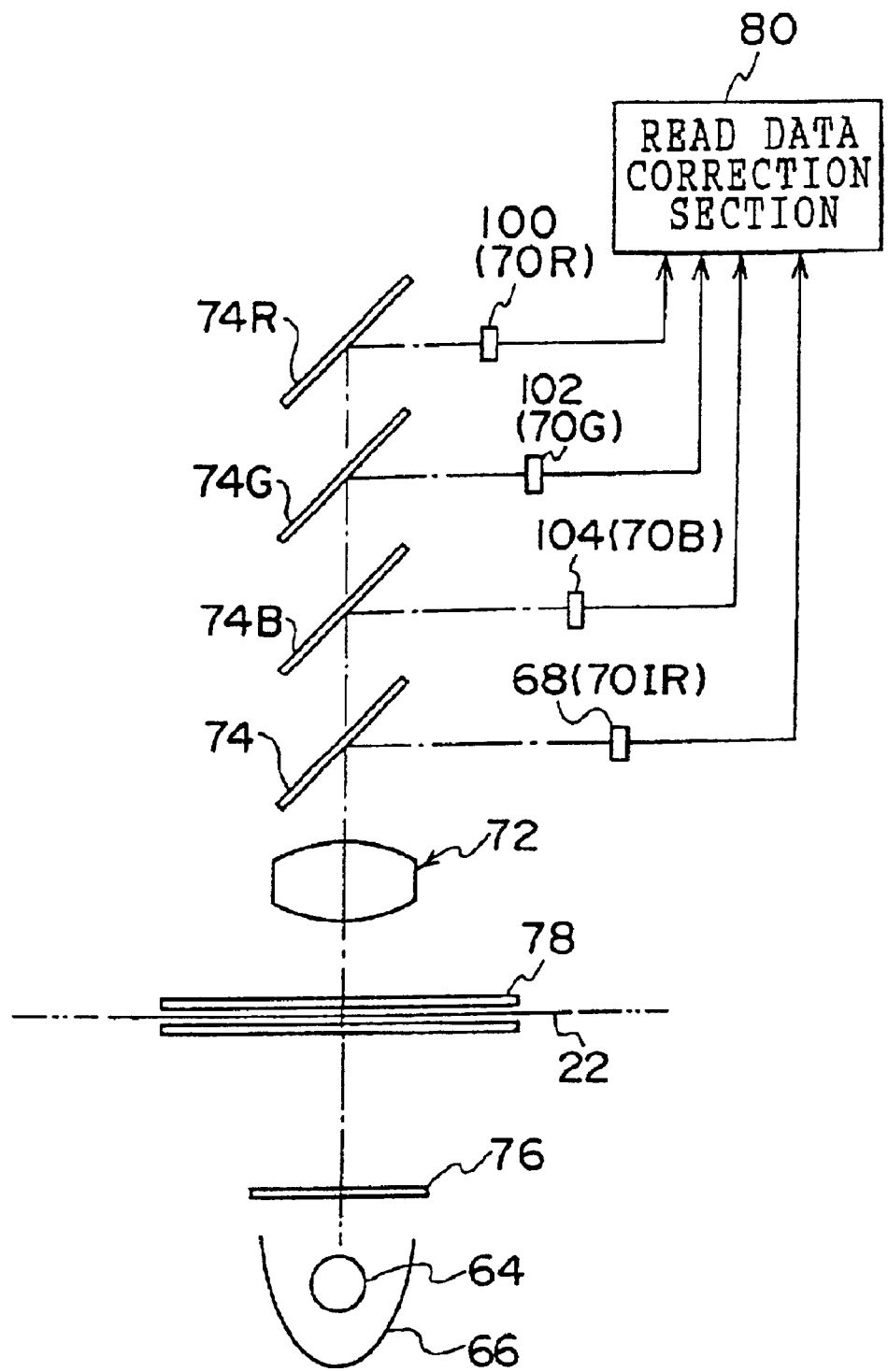
FIG. 8 is a schematic structural view of an important portion illustrating another example of the CCD scanner in accordance with the first embodiment.

For example, linear CCDs may be used for respective colors of m R, G and B, and IR. Namely, as illustrated in FIG. 8, a linear CCD 100 in which a CCD array 70R is provided, a linear CCD 102 in which a CCD array 70G is provided, a linear CCD 104 in which a CCD array 70B is provided, and a linear CCD 68 in which a CCD array 70IR is provided, may be used.

In this case, in addition to a dichroic mirror 74 for infrared light, dichroic mirrors 74R, 74G, and 74B, whose reflectances with respect to respective colors of R, G, and B are high, are disposed on the optical axis, and the linear CCDs 100, 102, and 104 are disposed in reflecting directions of dichroic mirrors 74R, 74G, and 74B.

Figure 9:
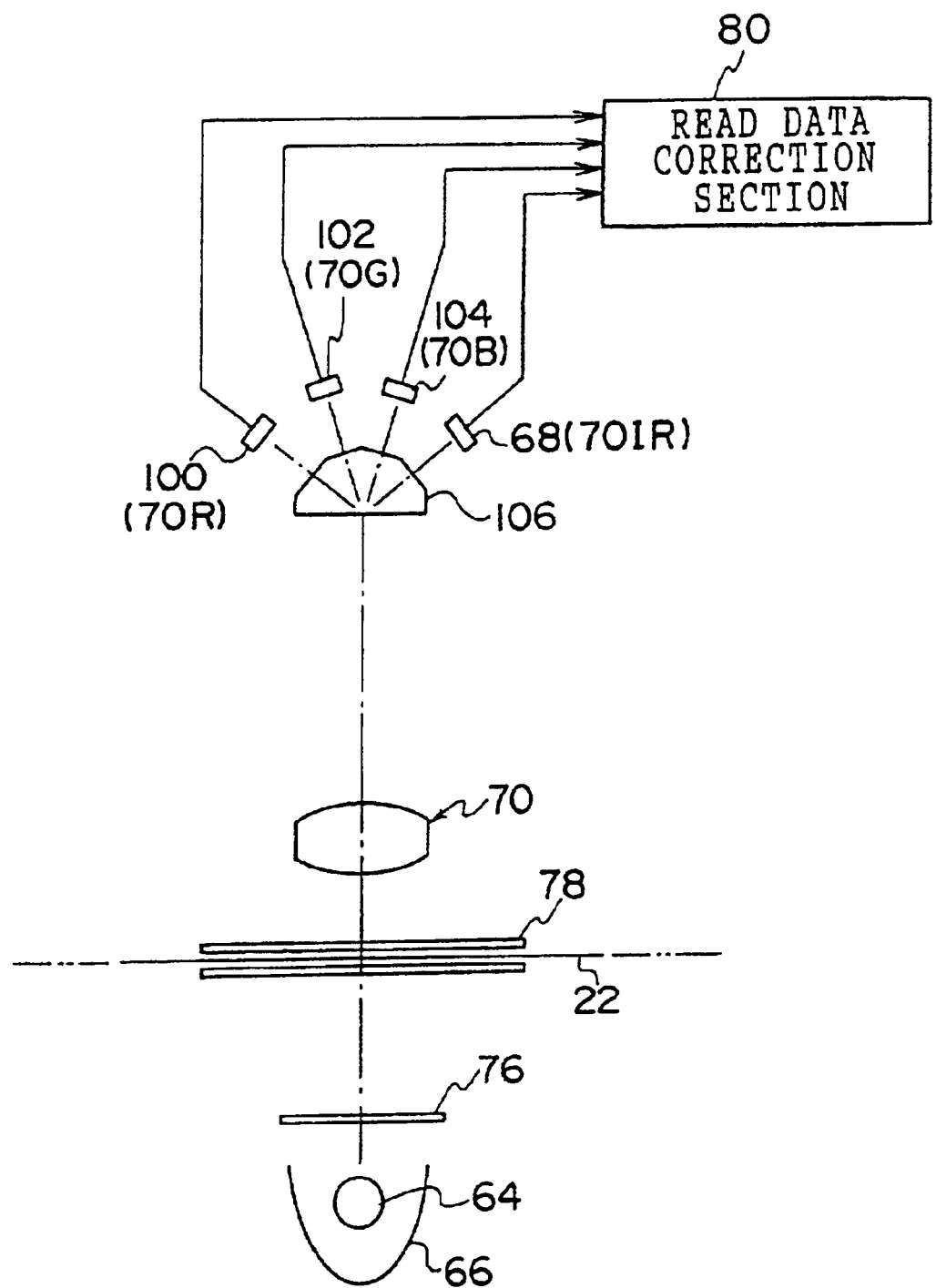
FIG. 9 is a schematic structural view of an important portion illustrating another example of the CCD scanner in accordance with the first embodiment.

As shown in FIG. 9, instead of a dichroic mirror, a dichroic prism 106 may be used. The dichroic prism 106 is designed such that its refraction direction is changed for R, G and B, and IR. The linear CCDs 100, 102, 104, and 68 are disposed in refraction directions of R, G, B, and IR, respectively.

In the first embodiment, the dichroic mirror 74 is used to separate R, G and B of visible light from infrared light which is invisible light, but the present invention is not limited to this case. For example, a so-called dichroic prism, whose refractive index with respect to visible light is different from that with respect to invisible light, may also be used. In this case, the linear CCD 30 is disposed in a refraction direction of visible light from the dichroic prism and the linear CCD 68 is disposed in a refraction direction of the infrared light which is invisible light.

In either case, the linear CCD 68 is disposed in a position in which the axial chromatic aberration of an optical system such as the lens unit 72 or the like with respect to infrared light is substantially eliminated.

Second Embodiment

Next, a second embodiment of the present invention will be described. A basic structure of the second embodiment is as same as that of the first embodiment. In the second embodiment, components which are the same as those of the first embodiment are designated by the same reference numerals, and descriptions thereof are omitted.

Figure 10:
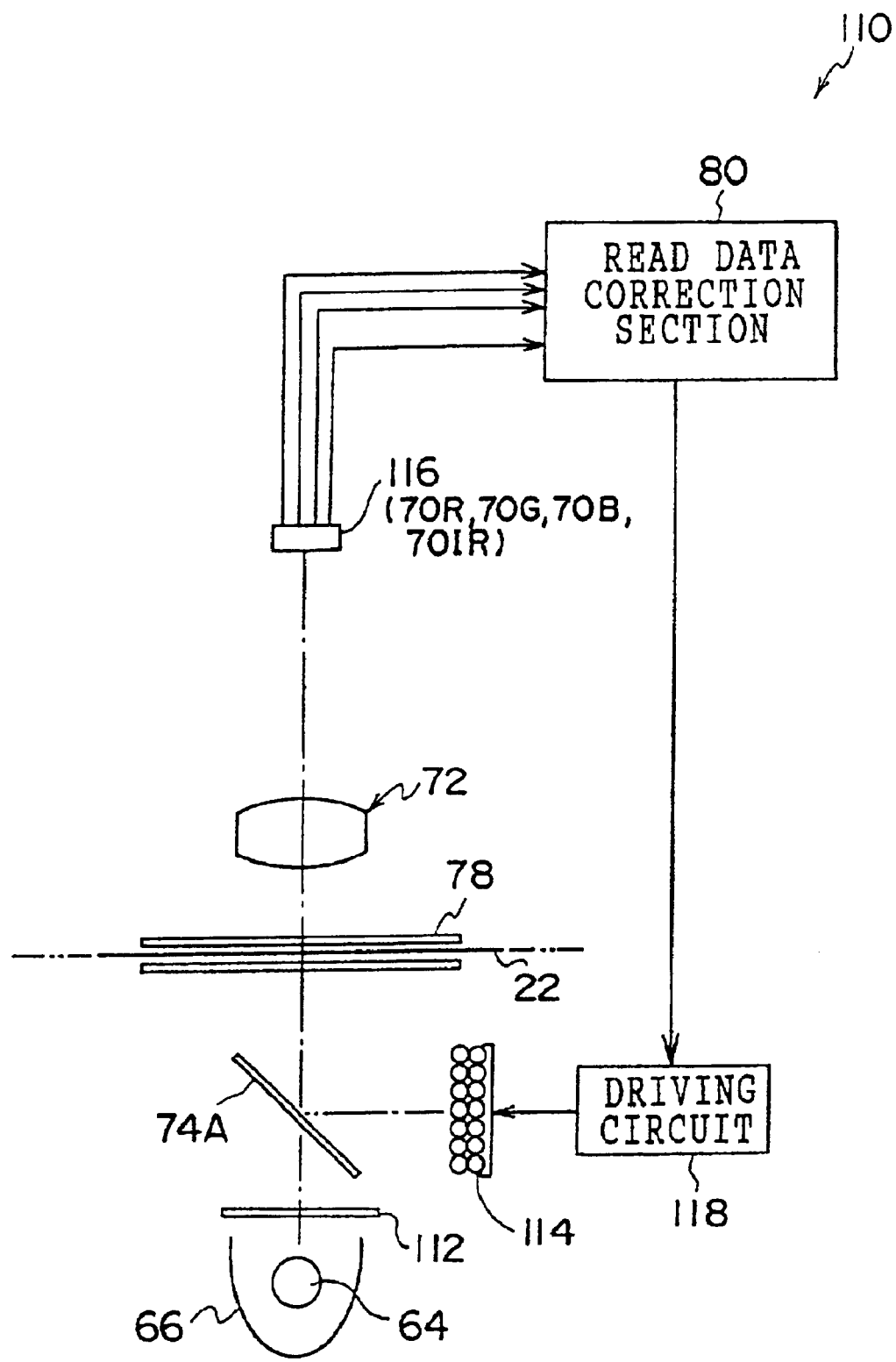
FIG. 10 is a schematic structural view of an important portion illustrating a CCD scanner in accordance with a second embodiment.

FIG. 10 shows a schematic structure of a CCD scanner 110 used in the second embodiment. In the CCD scanner 110, instead of the IR light reducing filter 76 in the CCD scanner 14 used in the first embodiment, a conventionally known IR cutting filter 112 is provided.

Infrared light, which is invisible light and emitted together with visible light from a light source, is blocked by the IR cutting filter 112 such that only visible light is illuminated onto the photographic film 22.

On the other hand, in the CCD scanner 110, a dichroic mirror 74A which reflects the infrared light is disposed on the optical axis between the IR cutting filter 112 and a conveying path of the photographic film 22. Further, the CCD scanner 110 is provided with an IR-LED 114 as a light source which faces an infrared light reflecting surface of the dichroic mirror 74A and emits infrared light.

Accordingly, infrared light emitted from the IR-LED 114 is reflected by the dichroic mirror 74A to be irradiated onto the photographic film 22 together with visible light emitted from the light source 64.

The CCD scanner 110 is provided with a linear CCD 116 which includes CCD arrays 70R, 70G, 70B, and 70IR in which light receiving elements of R, G and B, and IR are respectively arranged in straight lines. Visible light and infrared light which have been transmitted through the photographic film 22 and the lens unit 72 are imaged on the linear CCD 116. The CCD array 70IR is disposed at a position in which, in accordance with the axial chromatic aberration of the lens unit 72, the axial chromatic aberration is eliminated.

As illustrated in FIGS. 10 and 11, the CCD scanner 110 is provided with a driving circuit 118 which drives and turns on the IR-LED 114. As shown in FIG. 11, the synchronized signal T, which is generated in a synchronized signal generating section 92, is inputted to the driving circuit 118. The driving circuit 118 drives the IR-LED 114 on the basis of the synchronized signal T.

The driving circuit 118 drives and turns on the IR-LED 114 such that the intensity of infrared light emitted from the IR-LED 114 does not damage the photographic film 22 and the CCD array 70IR is not saturated.

In the CCD scanner 110 which is structured as described above, when pre-scanning is finished, fine-scanning starts on the basis of image reading conditions set by the pre-scan.

In the CCD scanner 110, when the fine-scan starts, while the photographic film 22 is conveyed at a predetermined speed v, the linear CCD 116 is operated on the basis of the synchronized signal T generated at the synchronized signal generating section 92 such that R, G and B color component data are fetched on a line-by-line basis. At this time, on the basis of the synchronized signal T generated in the synchronized signal generating section 92, the driving circuit 118 drives the IR-LED 114 for a predetermined period of time. In this way, the IR-LED 114 emits infrared light and the infrared light is transmitted through the photographic film 22 to be imaged on the linear CCD 116.

Figure 12A:
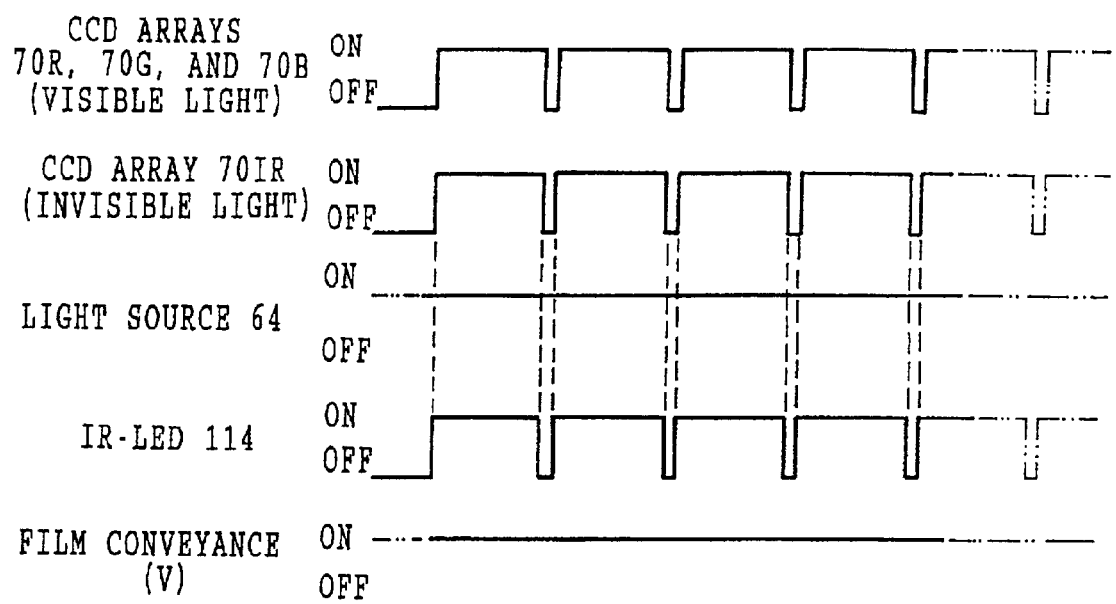
FIG. 12A is a timing chart illustrating an example of timings for receiving visible light and invisible light, and for lighting a light source, in accordance with the second embodiment.

For example, as illustrated in FIG. 12A, the light source 64 which emits visible light is always turned on, but the IR-LED 114 which emits infrared light which is invisible light is turned on only when the CCD array 70IR receives the infrared light.

Infrared light image data can be read so as to be synchronized with the reading of R, G and B image data from the photographic film 22. As a result, the time for scanning the photographic film 22 is not long since the reading of the image data of infrared light which has been transmitted through the photographic film 22 is effected.

Because the IR-LED 114 which emits infrared light is turned on only when the CCD array 70IR receives the infrared light, it is possible to prevent a greater amount of infrared light than it is needed from being irradiated onto the photographic film 22.

Further, in the CCD scanner 110, lighting time of the IR-LED 114 can be adjusted by the driving circuit 118, and therefore, detection failure of an infrared light image, caused by unnecessarily turning on the IR-LED 114 to saturate light receiving elements which detect the infrared light, is not caused.

In FIG. 12A, although the receiving of visible light by the CCD arrays 70R, 70G, and 70B can be simultaneously carried out with the receiving of invisible light by the CCD array 70 IR, the timing of receiving visible light or invisible light is not limited to this case. For example, when infrared light is received by the CCD array 70IR so as to be synchronized with the receiving of visible light by the CCD arrays 70R, 70G, and 70B, visible light and invisible light can be alternatively received by the CCD arrays 70R, 70G and 70B, and the CCD array 70IR.

Figure 12B:
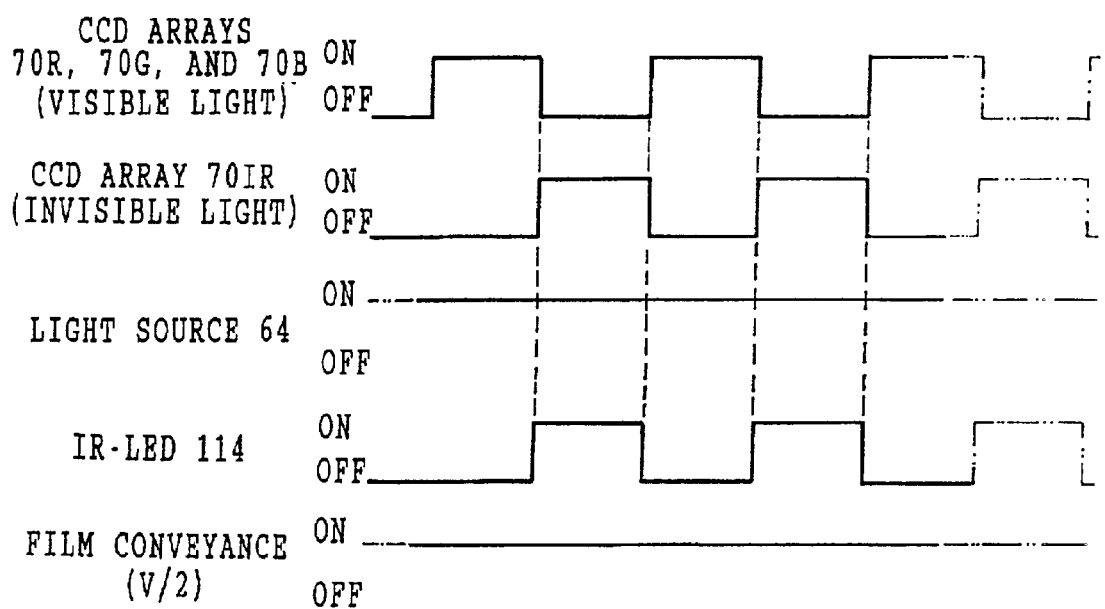
FIG. 12B is a timing chart illustrating an example of timings for receiving visible light and invisible light, and for lighting the light source, which is applicable to the present invention.

That is to say, as shown in FIG. 12B, when the CCD arrays 70R, 70G, and 70B are turned off, the CCD array 70IR is turned on. When the CCD array 70IR is turned off, the CCD arrays 70R, 70G, and 70B are turned on.

In order to obtain predetermined resolution, it is necessary to convey the photographic film 22 at a speed of v/2 at this time. However, time can be reduced in comparison with a case in which the scanning of visible light and the scanning of invisible light are separately carried out.

Because the IR-LED 114 turns off when the CCD array 70IR turns on, the CCD arrays 70R, 70G, and 70B do not receive infrared light emitted by the IR-LED 114. Among the CCD arrays 70R, 70G, and 70B which receive visible light, there are some CCD arrays whose light receiving amount is effected by the infrared light. When visible light is received by the CCD arrays 70R, 70G, and 70B, the IR-LED 114 is turned off, and therefore, image data, in which only visible light is appropriately received, can be obtained.

When scanning using visible light and scanning using invisible light are carried out separately, dust adhering to the photographic film 22 may move because there is a large time difference between scanning using visible light and scanning using invisible light and conveyance of the photographic film 22 may effect scanning. However, by carrying out scanning using visible light and scanning using invisible light in parallel, dust adhering to the photographic film 22 can be prevented from moving between the time when visible light is received and the time when invisible light is received. Therefore, appropriate image data using invisible light can be obtained.

In the above-described embodiments, although a linear CCD is used as first and second photoelectric conversion devices, another structure such as an area CCD or the like may be used. When the area CCD is used, the photographic film 22 is conveyed on a frame-by-frame basis and an image frame is stopped at a position which faces the area CCD and then image reading is carried out.

In the present embodiments, a description has been given of the CCD scanners 14 and 110 provided in the digital laboratory system 10 which are applied to the present invention, but the CCD scanners 14 and 110 may be used as a single unit. The present invention can be applied to various image reading apparatuses in which an image can be read from, in addition to the photographic film, various transmission originals.

Although infrared light is used as invisible light in the present embodiments, in addition to the infrared light, ultraviolet ray may be used. In this case, a light source which emits the ultraviolet ray is provided together with a light source which emits visible light to detect image data of the ultraviolet ray which has been transmitted through a transmission original.

As described above, according to the present invention, the reading of image data based on invisible light such as infrared light can be effected at the same time that the reading of R, G and B image data is effected. Therefore, extended image reading time due to the detection of scratches or dust adhering to the transmission original being carried out by using invisible light can be prevented. Thus, accurate image data can be obtained and the present invention has excellent effects.

What is claimed is:

1. An apparatus for reading an image comprising:
   a light source, which when operated, emits visible light and invisible light towards an image disposed along an optical path followed by the light;
   a first reading device disposed downstream from the image along the optical path, the first reading device having a visible light sensor which receives light and produces electronic data in accordance with received light in visible wavelengths, when operated;
   a second reading device disposed downstream from the image along the optical path, the second reading device having an invisible light sensor which receives light and produces electronic data in accordance with received light in invisible wavelengths, when operated;
   a controller electronically connected to the first reading device and the second reading device, and synchronizing electronic data from the first and second reading devices with one another; and
   a correcting device electronically connected to the first and second reading devices, which receives data therefrom and corrects data from the first reading device based on data from the second reading device.

2. The apparatus according to claim 1, wherein said controller controls said first reading device and said second reading device so that each produces electronic data simultaneously with one another.

3. The apparatus according to claim 1, wherein said controller controls said first reading device and said second reading device so that the devices alternately produce electronic data with one another.

4. The apparatus according to claim 1, further comprising a deflecting device disposed downstream from the image along the optical path, and guiding visible light transmitted along the optical path to said first reading device, and invisible light to said second reading device.

5. The apparatus according to claim 1, further comprising a light reducing device disposed along the optical path, which reduces an amount of light emitted from said light source to no more than a predetermined level.

6. The apparatus according to claim 1, wherein said light source comprises:
   a first light emitter which emits visible light when operated;
   a second light emitter which emits invisible light when operated; and
   a deflecting device disposed along the optical path upstream from the image, which substantially reflects one of visible light emitted from said first light source and invisible light emitted from said second light source to said image, and substantially transmits the other therethrough.

7. The apparatus according to claim 6, wherein said controller controls such that said second light source emits invisible light only when said second reading device is being operated for receiving light and producing electronic data in accordance therewith.

8. The apparatus according to claim 1, further comprising:
   a timing device which provides timing information for operation of said first reading device and said second reading device,
   wherein said controller controls such that, on the basis of timing information received from said timing device, said first and second reading devices are operated.

9. The apparatus according to claim 8, wherein said timing device provides timing information such that, at least, operation of said first and second reading devices commences substantially at the same time.

10. The apparatus according to claim 8, wherein said timing device provides timing information such that, at least, operation of said first and second reading devices terminate at substantially the same time.

11. The apparatus according to claim 1, wherein said second reading device is disposed on the basis of axial chromatic aberration of invisible light such that a position on said image from which said first reading device receives at least some visible light, substantially coincides with a position on said image from which said second reading device receives at least some invisible light.

12. A method of reading an image comprising the steps of:
   (a) disposing an image for exposure to light, when the light travels along an optical path;
   (b) emitting visible light and invisible light along the optical path, upstream of the image, thereby exposing the image to visible light and invisible light;
   (c) receiving visible light along the optical path, downstream of the image, and producing first electronic data in accordance with the received visible light;
   (d) receiving invisible light along the optical path, downstream of the image, and producing second electronic data in accordance with the received invisible light;
   (e) controlling the production of first and second electronic data, such that said first and second electronic data is correlated with one another; and (f) correcting said first electronic data based on said second electronic data.

13. The image reading method according to claim 12, wherein in the step of controlling the production of first and second electronic data, the first and second electronic data is produced substantially simultaneously with one another.

14. The image reading method according to claim 12, wherein in the step of controlling the production of first and second electronic data, the first and second electronic data is alternately produced relative to one another.

15. The image reading method according to claim 12, further comprising the step of guiding visible light along the optical path, downstream of the image, to a first reading device, and guiding invisible light along the optical path, downstream of the image, to a second reading device.

16. The image reading method according to claim 12, further comprising the step of reducing an amount of invisible light to a predetermined range along the optical path, upstream of the image.

17. The image reading method according to claim 12, wherein the step of controlling the production of first and second electronic data, includes providing timing information, and the step of controlling the production of first and second electronic data is performed in accordance with the timing information to correlate first and second electronic data with one another.

18. The image reading method according to claim 17, wherein the step of controlling the production of first and second electronic data in accordance with the timing information, is performed to initiate the production of first and second electronic data at substantially the same time.

19. The image reading method according to claim 17, wherein the step of controlling the production of first and second electronic data in accordance with the timing information, is performed to terminate the production of first and second electronic data at substantially the same time.

* * * * *